US010830391B2

(12) United States Patent
Pedrami et al.

(10) Patent No.: US 10,830,391 B2
(45) Date of Patent: Nov. 10, 2020

(54) METERING OF OIL FLOW TO ENGINE PROPELLER

(71) Applicant: PRATT & WHITNEY CANADA CORP., Longueuil (CA)

(72) Inventors: Reza Pedrami, Montreal (CA); James Robert Jarvo, St. Bruno (CA); Benjamin Renaud, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 349 days.

(21) Appl. No.: 16/100,768

(22) Filed: Aug. 10, 2018

(65) Prior Publication Data

US 2019/0003642 A1 Jan. 3, 2019

Related U.S. Application Data

(63) Continuation of application No. 15/209,215, filed on Jul. 13, 2016, now Pat. No. 10,072,796.

(51) Int. Cl.
| | |
|---|---|
| *G06F 17/00* | (2019.01) |
| *F16N 29/02* | (2006.01) |
| *B64C 11/30* | (2006.01) |
| *B64C 11/40* | (2006.01) |
| *B63H 3/08* | (2006.01) |
| *G01F 15/00* | (2006.01) |
| *B64C 11/00* | (2006.01) |

(52) U.S. Cl.
CPC ............ *F16N 29/02* (2013.01); *B63H 3/08* (2013.01); *B64C 11/00* (2013.01); *B64C 11/303* (2013.01); *B64C 11/40* (2013.01); *G01F 15/003* (2013.01); *F16N 2210/08* (2013.01); *F16N 2230/00* (2013.01); *F16N 2250/04* (2013.01); *F16N 2250/08* (2013.01); *F16N 2270/20* (2013.01)

(58) Field of Classification Search
CPC .. F16N 29/02; F16N 2210/08; F16N 2230/00; F16N 2250/04; F16N 2250/08; F16N 2270/20; B63H 3/08; B64C 11/00; B64C 11/303; B64C 11/40; G01F 15/003
USPC ............................................................ 701/3
See application file for complete search history.

(56) References Cited

U.S. PATENT DOCUMENTS

| | | | |
|---|---|---|---|
| 2,478,752 A * | 8/1949 | Drake | G05D 13/00 60/463 |
| 2,640,550 A | 6/1953 | Knapp et al. | |
| 2,645,293 A | 7/1953 | Ogle et al. | |
| 2,683,493 A * | 7/1954 | Grinyer | B64C 11/42 416/48 |
| 2,737,252 A | 3/1956 | Knapp et al. | |

(Continued)

FOREIGN PATENT DOCUMENTS

| | | |
|---|---|---|
| JP | H05193561 | 8/1993 |
| JP | 2871209 | 3/1999 |

OTHER PUBLICATIONS

F P M Dullens et al.: "Modeling and Control of a Controllable Pitch Propeller" Feb. 11, 2009 (Feb. 11, 2009), XP055425083, Retrieved from the Internet URL: http://www.mate.tue.nl/mate/pdfs/10299.pdf.

*Primary Examiner* — Ronnie M Mancho
(74) *Attorney, Agent, or Firm* — Norton Rose Fulbright Canada LLP

(57) ABSTRACT

There is described herein methods and system for correcting steady state errors in propeller speed by calculating a leakage flow rate as a function of engine and propeller parameters.

18 Claims, 7 Drawing Sheets

(56) References Cited

U.S. PATENT DOCUMENTS

| | | | |
|---|---|---|---|
| 2,957,655 A | 10/1960 | Knapp et al. | |
| 2,965,179 A | 12/1960 | Reggio | |
| 3,545,881 A | 12/1970 | Naulty | |
| 8,360,728 B2 | 1/2013 | Hildebrand et al. | |
| 9,061,760 B2 | 6/2015 | Fenny | |
| 2014/0003941 A1* | 1/2014 | Leclercq | F15B 9/10 |
| | | | 416/23 |
| 2015/0112515 A1 | 4/2015 | Conway | |
| 2016/0011601 A1 | 1/2016 | Inagaki et al. | |
| 2016/0195017 A1* | 7/2016 | Vick | F02C 7/22 |
| | | | 60/39.511 |
| 2017/0361919 A1* | 12/2017 | Waddleton | F04D 29/582 |

* cited by examiner

METERING OF OIL FLOW TO ENGINE PROPELLER

CROSS-REFERENCE TO RELATED APPLICATIONS

The present application is a continuation of U.S. patent application Ser. No. 15/209,215 filed on Jul. 13, 2016, the contents of which are hereby incorporated by reference in their entirety.

TECHNICAL FIELD

The application relates generally to metering oil delivery to an engine propeller and, more particularly, to compensating for oil leakage when metering oil delivery.

BACKGROUND OF THE ART

Aircraft engines are equipped with a propeller governor to sense the speed of the engine and change the propeller blade pitch angle to maintain a desired speed, regardless of the operational conditions of the aircraft. In electronic control systems, a controller modulates an electro-hydraulic servo-valve proportionally to a speed error and oil flow is metered to the propeller through the valve. However, electronic propeller control systems do not account for oil leakage of the propeller shaft. This leads to steady state errors in the propeller speed throughout the operational envelope of the aircraft. Similarly, hydro-mechanical systems that operate with a propeller governor also fail to compensate for oil leakage and thus experience the same problem with steady state errors.

SUMMARY

There is described herein methods and system for correcting steady state errors in propeller speed by calculating a leakage flow rate as a function of engine and propeller parameters.

In one aspect, there is provided a method for metering oil flow to a propeller of an engine. The method comprises receiving a requested propeller speed and an actual propeller speed; generating an oil flow request based on a difference between the requested propeller speed and the actual propeller speed; determining a leakage flow rate as a function of parameters of the engine and the propeller and generating a leakage compensation component; combining the leakage compensation component with the oil flow request to obtain a compensated oil flow request; and outputting the compensated oil flow request to an oil metering unit of the propeller.

In another aspect, there is provided a system for metering oil flow to a propeller of an engine. The system comprises a processing unit and a non-transitory memory communicatively coupled to the processing unit and comprising computer-readable program instructions. The instructions are executable by the processing unit for receiving a requested propeller speed and an actual propeller speed; generating an oil flow request based on a difference between the requested propeller speed and the actual propeller speed; determining a leakage flow rate as a function of parameters of the engine and the propeller and generating a leakage compensation component; combining the leakage compensation component with the oil flow request to obtain a compensated oil flow request; and outputting the compensated oil flow request to an oil metering unit of the propeller.

In a further aspect, there is provided a system for metering oil flow to a propeller of an engine. The system comprises means for receiving a requested propeller speed and an actual propeller speed; means for generating an oil flow request based on a difference between the requested propeller speed and the actual propeller speed; means for determining a leakage flow rate as a function of parameters of the engine and the propeller and generating a leakage compensation component; means for combining the leakage compensation component with the oil flow request to obtain a compensated oil flow request; and means for outputting the compensated oil flow request to an oil metering unit of the propeller.

DESCRIPTION OF THE DRAWINGS

Reference is now made to the accompanying figures in which.

DETAILED DESCRIPTION

Figure 1:
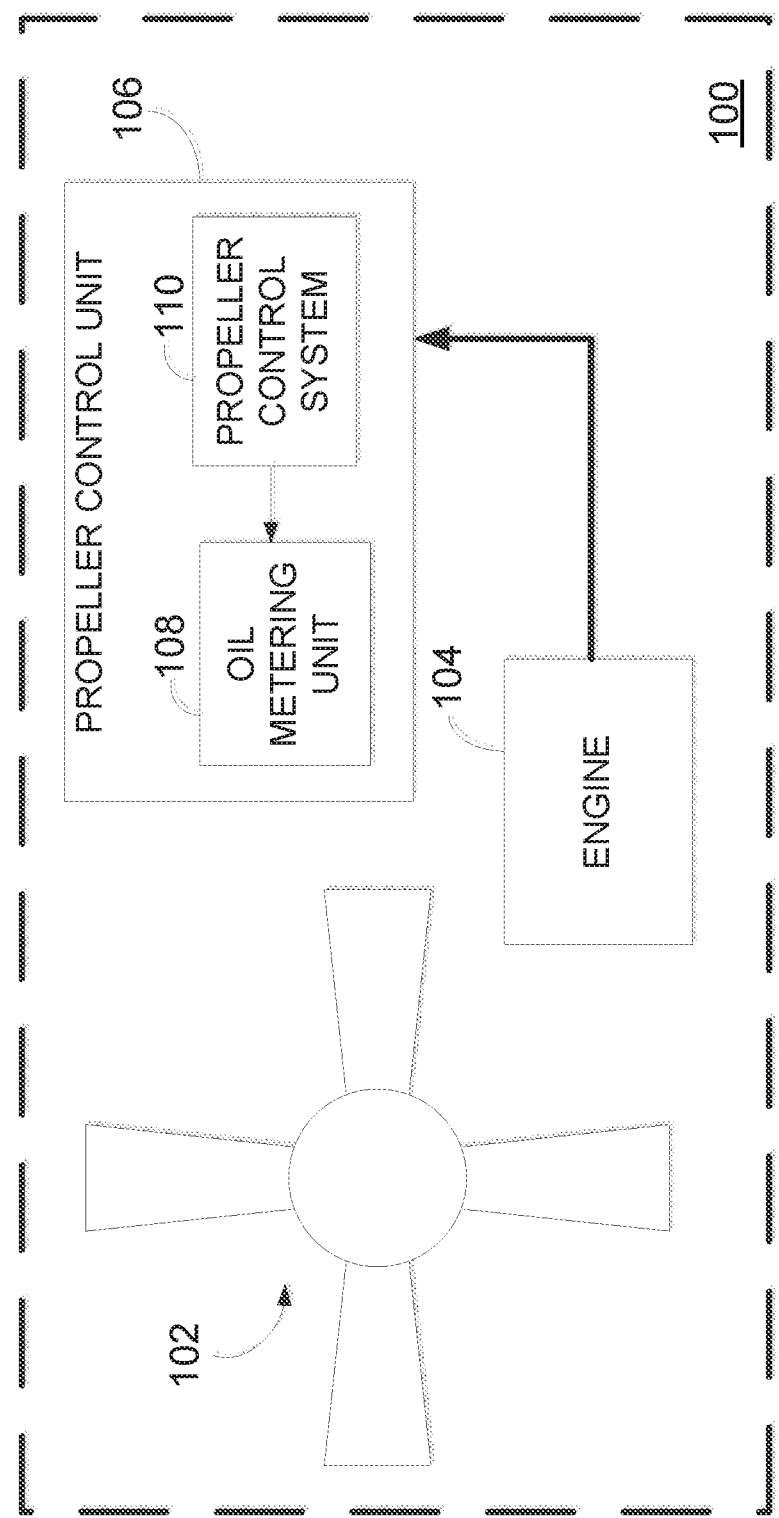
FIG. 1 is a schematic diagram of an example aircraft.

FIG. 1 illustrates an example aircraft 100 comprising an engine 104 having a propeller 102. A propeller control unit 106 is operatively connected to an engine 104. The aircraft 100 may be any type of propeller-driven aircraft 100. The engine 104 may be any engine 104 having a propeller 102, such as a turboprop engine, a piston engine, a turboshaft engine, and the like.

The propeller control unit 106 is configured for control and operation of the propeller 102. In some embodiments, the propeller 102 is a hydromatic propeller, in which a pitch changing mechanism is a mechanical-hydraulic system. Hydraulic forces acting upon a piston are transformed into mechanical forces acting upon the blades of the propeller 102. Piston movement causes rotation, and oil forces act upon the piston. A propeller control system 110 is illustratively provided in the propeller control unit 106 for metering oil flow to the propeller 102 via the oil metering unit 108. The oil metering unit 108 may be, for example, an electro-hydraulic servo valve (EHSV). In some embodiments, the propeller control system 110 may be provided externally to the propeller control unit 106 and connected thereto, for example as a stand-alone device or integrated within another device, such as an engine control unit (ECU), an engine electronic controller (EEC), an engine electronic control system, and a Full Authority Digital Engine Controller (FADEC). Data may be exchanged between the propeller control system 110 and the propeller control unit 106 on a communication bus composed of various hardware components, such as one or more electrical wires and/or optical fibers, and/or software components. Transmission may take place using at least one communication protocol, such as but not limited to the ARINC Standards.

Figure 2:
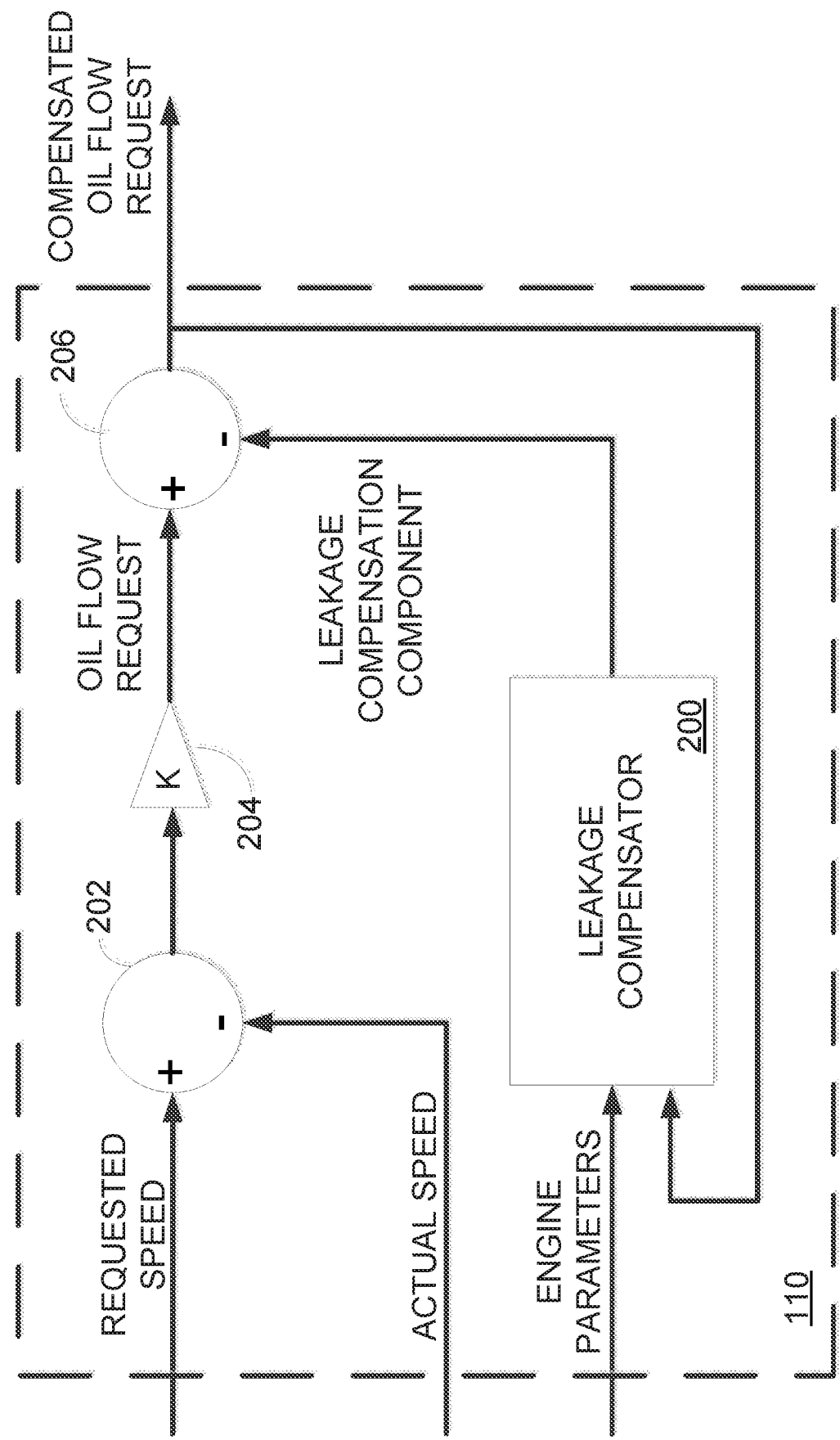
FIG. 2 is a block diagram of an example propeller control system.

FIG. 2 is an example embodiment of the propeller control system 110. The system 110 receives a requested speed as well as an actual speed for the propeller 102. These may be received from an engine computer (not shown) or an aircraft computer (not shown). In some embodiments, the requested speed is received from an aircraft control, such as a throttle in a cockpit of the aircraft 100. A difference between the requested speed and the actual speed is obtained from an adder 202. A proportional speed controller 204, designed for addressing nominal errors primarily due to the power change in the propeller 102—receives the output from the adder 202, which may be referred to as the propeller speed ($N_p$) error in rotation per minute (RPM). A proportional gain value K, is applied to the $N_p$ error by the controller 204, which may be a proportional (P) controller, a proportional integral (PI) controller, or a proportional integral derivative (PID) controller, and an oil flow request is output therefrom.

The system 110 also comprises a leakage compensator 200, for addressing oil leakage from the propeller shaft. The leakage compensator 200 receives as input engine parameters and outputs a leakage compensation component, which is combined with the oil flow request via an adder 206, in order to output a compensated oil flow request. The compensated oil flow request is used to meter the oil flow to the propeller 102 through the oil metering unit 108.

Figure 3:
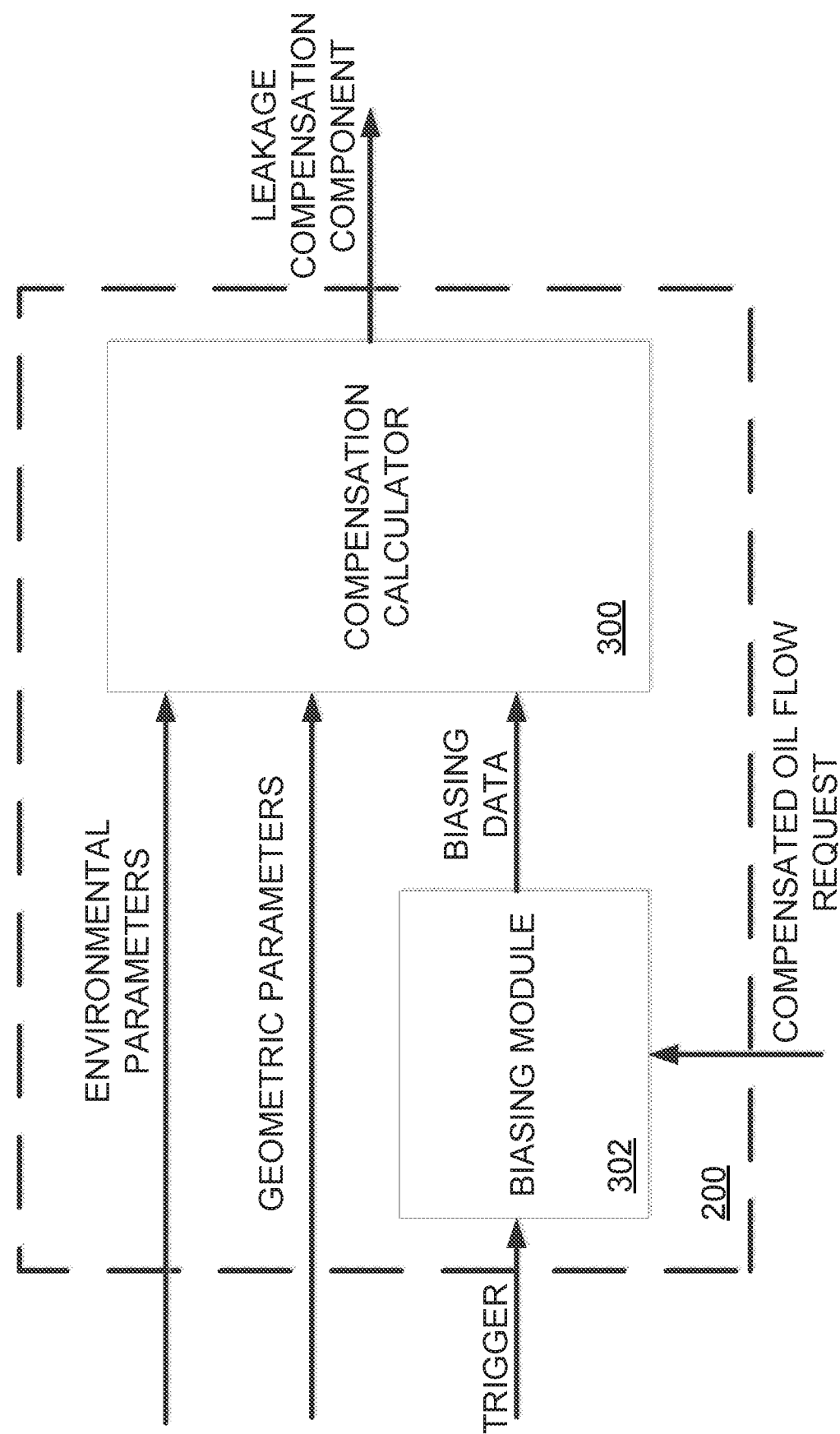
FIG. 3 is a block diagram of an example leakage compensator.

An example embodiment of the leakage compensator 200 is illustrated in FIG. 3. In this example, the leakage compensator 200 comprises a compensation calculator 300. The compensation calculator 300 receives engine and/or propeller parameters, such as engine and/or propeller environmental parameters and engine geometric parameters, and outputs the leakage compensation component after having determined a leakage flow rate as a function of the engine and/or propeller parameters. The engine/propeller environmental parameters relate to dynamic parameters in the environment of the engine/propeller that vary as the engine operates, such as pressure and temperature. The engine environmental parameters may be received as they change, or they may be retrieved by the leakage compensator 200 as needed. In addition, the engine environmental parameters may be estimated or monitored. The engine geometric parameters relate to static parameters representative of engine build. The engine geometric parameters may be determined offline and stored in a memory, for retrieval by the leakage compensator 200 as needed.

Figure 4:
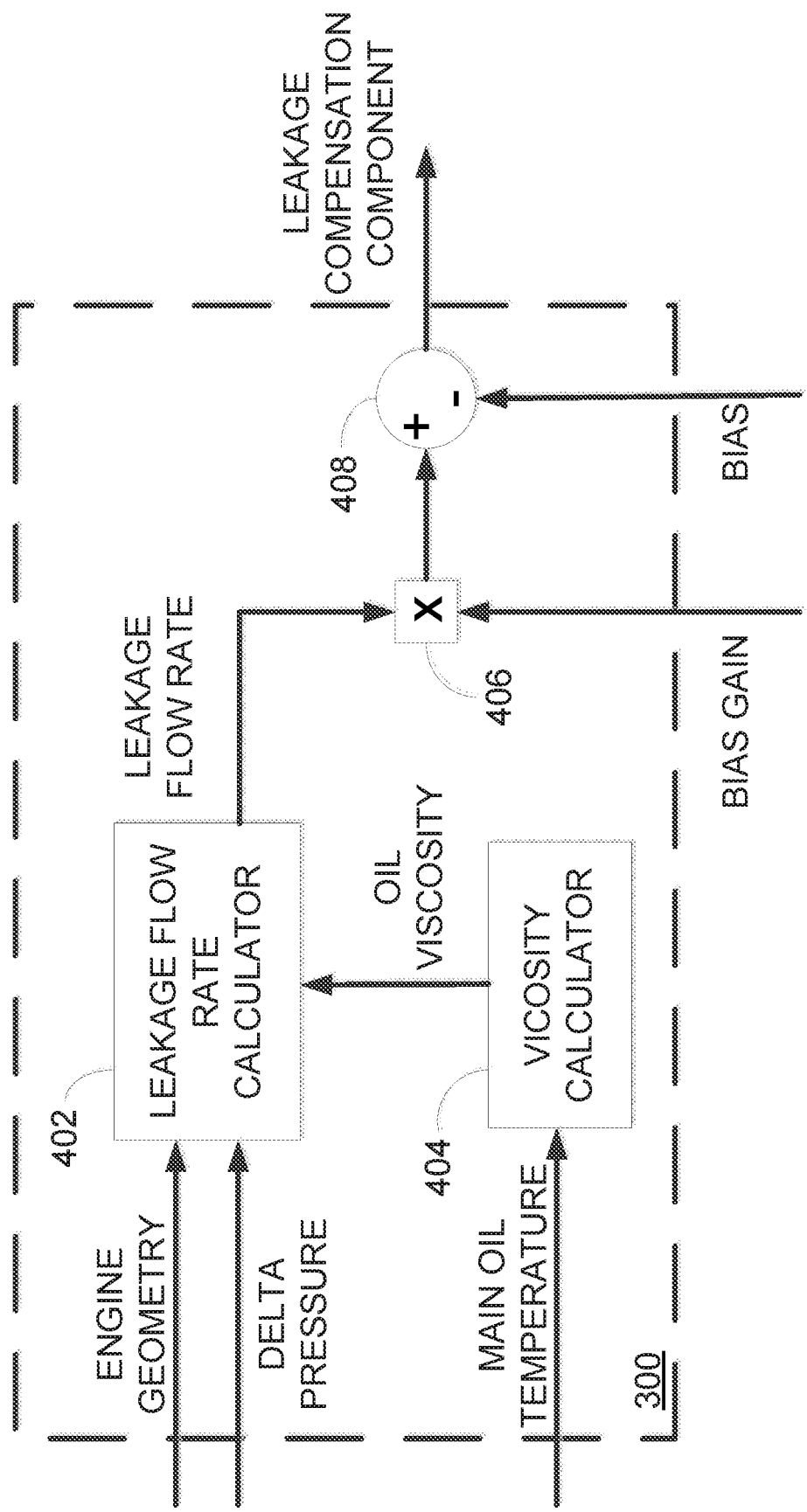
FIG. 4 is a block diagram of an example compensation calculator.

FIG. 4 is an example embodiment of the compensation calculator 300. A leakage flow rate calculator 402 receives the engine geometry parameters. The engine geometry parameters may be specific to the shaft of the propeller 102, for example shaft outside diameter. The engine geometry parameters may also relate to other measurements of the engine 104, such as land width, gap width, and the like. Pressure data is also received by the leakage flow rate calculator 402. In some embodiments, a delta pressure representative of a difference between propeller oil pressure and oil discharge pressure is received. Alternatively, propeller oil pressure and oil discharge pressure may be received separately and the delta pressure may be computed by the leakage flow rate calculator. The leakage flow rate calculator 402 may also consider oil viscosity, as determined by a viscosity calculator 404 on the basis of main oil temperature. Alternatively, oil viscosity is determined outside of the compensation calculator 300 and provided to the leakage flow rate calculator 402 directly.

In some embodiments, the leakage flow rate calculator 402 uses a leakage model based on laminar flow equations to estimate the leakage flow rate. For example, referring to FIG. 5, which illustrates a shaft 500 of diameter D that sits in a bore 502 of length L and diameter D+2c, the leakage flow rate may be estimated by:

$$\dot{m} = \frac{\pi}{12} \frac{\rho D c^3 \Delta P}{\mu L};$$

where ρ is density, ΔP is the pressure drop, μ is dynamic viscosity. Note that the shaft 500 is parallel to the bore 502 and has no eccentricity ratio ϵ=0.

In some embodiments, the leakage flow rate as output by the leakage flow rate calculator 402 is used as the leakage compensation component and combined with the oil flow request to generate the compensated oil flow request. Alternatively, the compensation calculator 300 further uses biasing data, as provided by a biasing module 302, to fine-tune the leakage flow rate as determined by the leakage flow rate calculator 402. This may be done to account for build variations in in the geometry of an engine 104. It may also be used to reduce the number of parameters considered by the leakage flow rate calculator 402 when determining the leakage flow rate. For example, pressure may be removed from the calculation of the leakage flow rate and the bias data may be adjusted to account for a nominal pressure. This may be considered as a trade-off between accuracy for the leakage compensation component and complexity of the system 110.

As illustrated in FIG. 3, the biasing module 302 may provide the biasing data to the compensation calculator 300 upon receipt of a trigger. The biasing data may comprise one or more bias values. One or more conditions may be used to trigger the biasing module 302. For example, the biasing data may be output and/or updated only when the propeller 102 is in steady state. When the propeller 102 is in steady state, there is no movement in the piston of a pitch change mechanism. Therefore, a request for oil flow only feeds a transfer sleeve, allowing transfer sleeve leakage to be determined more explicitly and steady state error to be reduced to a minimum value.

In another example, a specific operating mode of the engine, such as a maintenance mode, may be used as a trigger condition. Alternatively, or in combination therewith, an engine and/or aircraft setting may be used as a trigger condition, for example, when the engine is set to take-off power. This allows the leakage compensation component to be fine-tuned in specific engine and/or aircraft operating conditions, such as during take-off, where it may be more critical to avoid steady-state errors in propeller speed. In some embodiments, the biasing module 302 is triggered to output and/or update the biasing data upon every start of the engine 104, and/or upon a reconfiguration of the engine, i.e. when an active part of the engine/propeller hydraulics is changed. Biasing may be performed upon a manual trigger and/or upon an automatic trigger.

Returning to FIG. 4, a bias gain value may be applied to the leakage flow rate using a multiplier 406, and the output of the multiplier 406 may be combined with the bias value via an adder 408 in order to generate the leakage compensation component.

Figure 5:
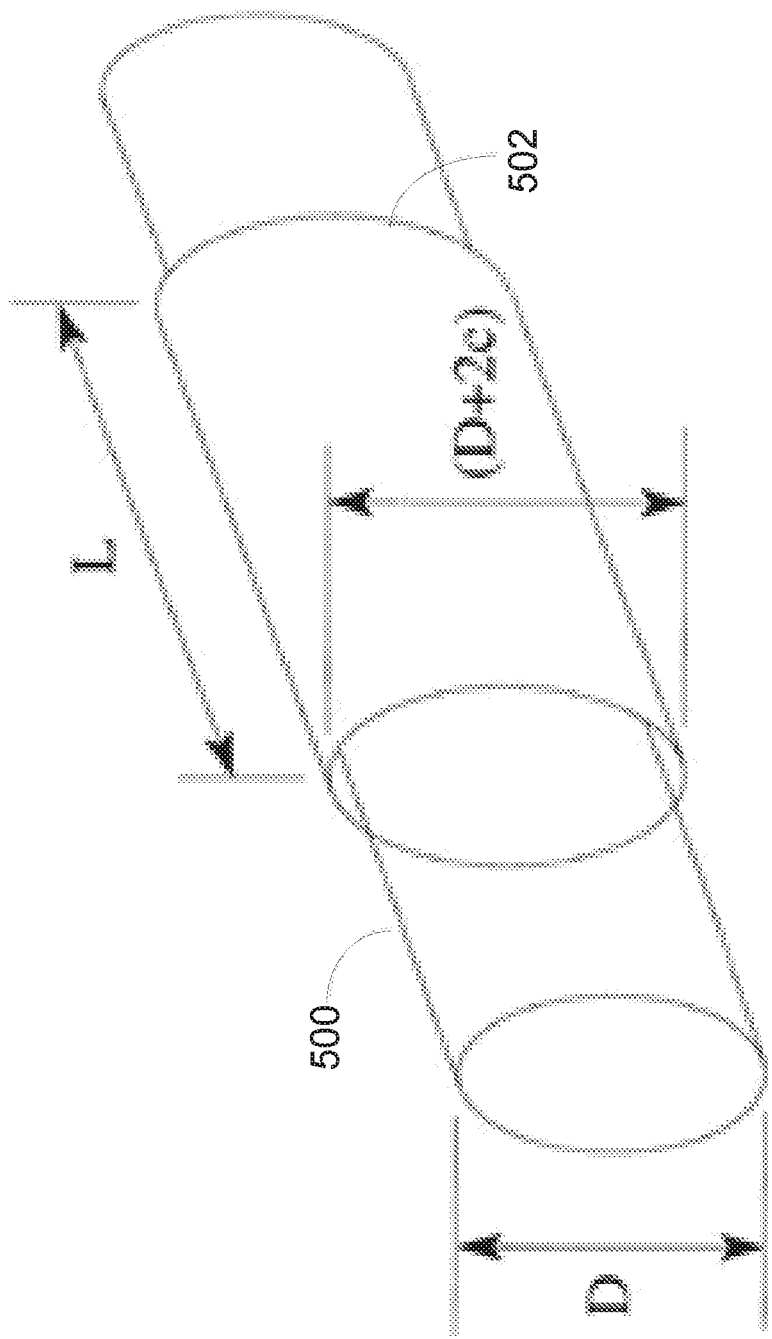
FIG. 5 is a schematic diagram of an example annular passage to estimate leakage flow rate.
Figure 6:
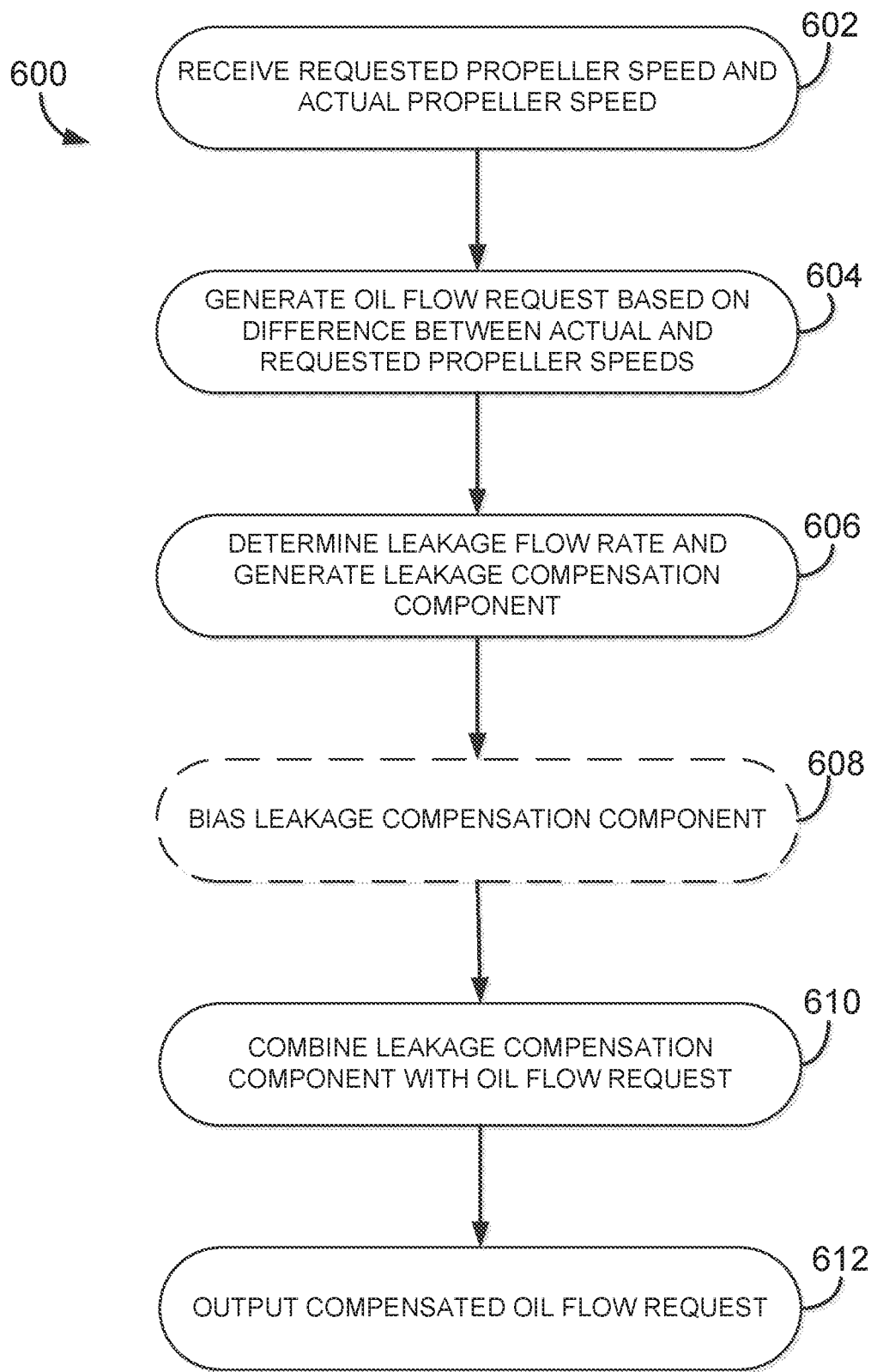
FIG. 6 is a flowchart of an example method for metering oil to a propeller.

A method 600 for metering oil flow to the propeller 102 of the engine 104 is illustrated in FIG. 5. At step 602, the requested propeller speed and actual propeller speed are received. At step 604, the oil flow request is generated based on the difference between the requested propeller speed and the actual propeller speed, for example using adder 202.

At step 606, the leakage flow rate is determined as a function of engine parameters, and the leakage compensation component is generated. In some embodiments, the leakage compensator 200 uses a leakage model to estimate the leakage flow rate, based on laminar flow equations. The engine parameters may be environmental and/or geometric, and may be monitored and/or estimated.

In an optional embodiment, step 608 comprises biasing the leakage compensation component towards a current value of the compensated oil flow request by providing a bias value to reduce a steady state error of the propeller speed. This may occur by providing a feedback loop from the output of adder 206 to the leakage compensator 200, as illustrated in FIG. 2, and the biasing module 302 outputs bias data for use by the compensation calculator 300 for generating the leakage compensation component. The biasing may be triggered upon one or more conditions, such as an engine and/or propeller maintenance mode setting, propeller steady state, engine start-up, engine reconfiguration, and engine/aircraft operating mode.

At step 610, the leakage compensation component is combined with the oil flow request, such as by adder 206, and the compensated oil flow request is output, for example to the oil metering unit 108, as per step 612.

The leakage compensation component is thus used to adjust the oil flow request output by the controller 204 to prevent steady state error in the propeller speed due to transfer sleeve leakage throughout the operational envelope of the aircraft 100.

Figure 7:
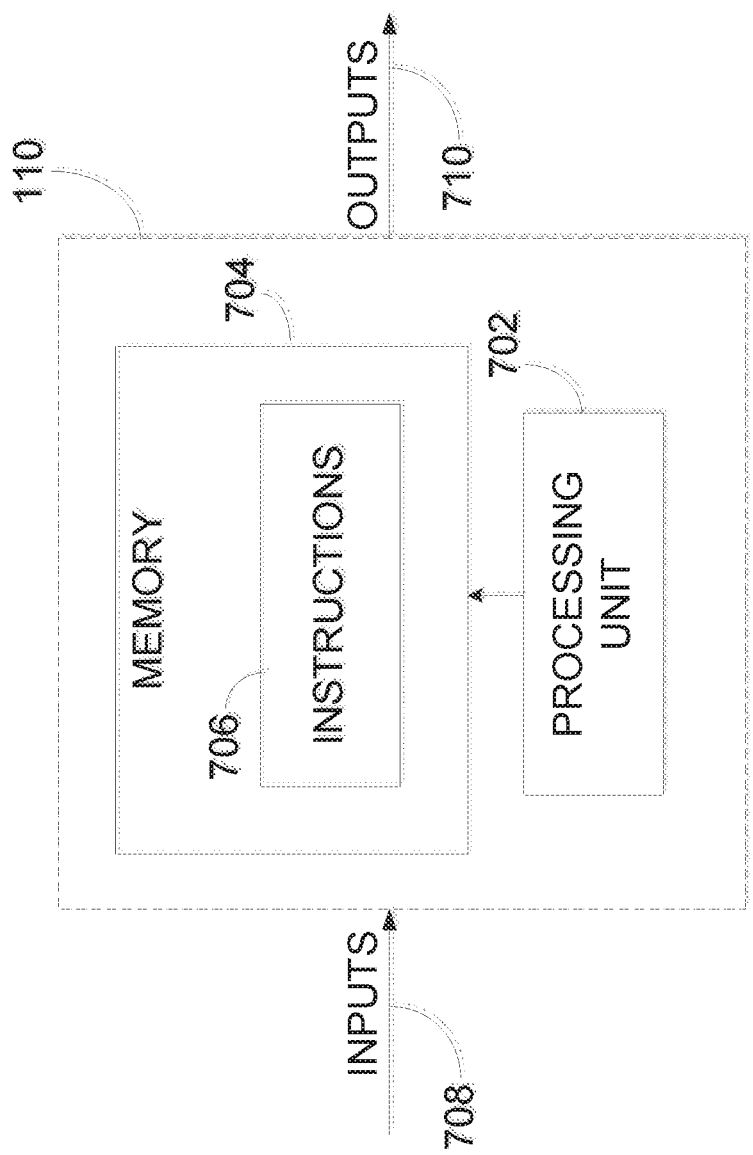
FIG. 7 is a block diagram of an example implementation of the propeller control system.

FIG. 7 shows a schematic representation of the propeller control system 110, as a combination of software and hardware components. The system 110 may comprise one or more processing units 702 and one or more computer-readable memories 704 storing machine-readable instructions 706 executable by the processing unit 702 and configured to cause the processing unit 702 to generate one or more outputs 710 based on one or more inputs 708. The inputs may comprise one or more signals representative of the requested speed, the actual speed, and the engine parameters. The outputs 710 may comprise one or more signals representative of the compensated oil flow request.

Processing unit 702 may comprise any suitable devices configured to cause a series of steps to be performed by system 110 so as to implement a computer-implemented process such that instructions 706, when executed by system 110 or other programmable apparatus, may cause the functions/acts specified in method 600 to be executed. Processing unit 702 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 704 may comprise any suitable known or other machine-readable storage medium. Memory 704 may comprise non-transitory computer readable storage medium such as, for example, but not limited to, an electronic, magnetic, optical, electromagnetic, infrared, or semiconductor system, apparatus, or device, or any suitable combination of the foregoing. Memory 704 may include a suitable combination of any type of computer memory that is located either internally or externally to system 110 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g. devices) suitable for retrievably storing machine-readable instructions 706 executable by processing unit 702.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 704) having computer readable program code (e.g., instructions 706) embodied thereon. The computer program product may, for example, be executed by a computer to cause the execution of one or more methods disclosed herein in entirety or in part.

Computer program code for carrying out operations for aspects of the present disclosure in accordance with instructions 706 may be written in any combination of one or more programming languages, including an object oriented programming language such as Java, Smalltalk, C++ or the like and conventional procedural programming languages, such as the "C" programming language or other programming languages. Such program code may be executed entirely or in part by a computer or other data processing device(s). It is understood that, based on the present disclosure, one skilled in the relevant arts could readily write computer program code for implementing the methods disclosed herein.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A computer-implemented method for metering oil flow to a propeller of an engine, the method comprising:
receiving engine parameters and propeller parameters at a propeller control system;
estimating, at the propeller control system, a leakage flow rate as a function of the engine parameters and the propeller parameters;
applying the leakage flow rate to an oil flow request to obtain a compensated oil flow request; and outputting the compensated oil flow request to an oil metering unit of the propeller.

2. The method of claim 1, wherein estimating the leakage flow rate comprises using a laminar flow model.

3. The method of claim 1, wherein the propeller parameters are environmental parameters and the engine parameters are environmental and geometric parameters.

4. The method of claim 3, wherein the environmental parameters comprise temperature and pressure.

5. The method of claim 3, wherein the geometric parameters comprise shaft propeller geometry.

6. The method of claim 1, further comprising biasing the leakage flow rate towards a current value of the compensated oil flow request using at least one bias value.

7. The method of claim 6, wherein the at least one bias value is updated when the engine is in a maintenance mode and the propeller is in a steady state.

8. The method of claim 6, wherein the at least one bias value is updated upon at least one of engine start-up and engine reconfiguration.

9. The method of claim 6, wherein the at least one bias value is updated when the engine is set to take-off power.

10. A system for metering oil flow to a propeller of an engine, the system comprising:
a processing unit; and
a non-transitory memory communicatively coupled to the processing unit and comprising computer-readable program instructions executable by the processing unit for:
receiving engine parameters and propeller parameters at a propeller control system;
estimating, at the propeller control system, a leakage flow rate as a function of the engine parameters and the propeller parameters;
applying the leakage flow rate to an oil flow request to obtain a compensated oil flow request; and
outputting the compensated oil flow request to an oil metering unit of the propeller.

11. The system of claim 10, wherein estimating the leakage flow rate comprises using a laminar flow model.

12. The system of claim 10, the propeller parameters are environmental parameters and the engine parameters are environmental and geometric parameters.

13. The system of claim 12, wherein the environmental parameters comprise temperature and pressure.

14. The system of claim 12, wherein the geometric parameters comprise shaft propeller geometry.

15. The system of claim 10, wherein the program instructions are further executable for biasing the leakage flow rate towards a current value of the compensated oil flow request using at least one bias value.

16. The system of claim 15, wherein the at least one bias value is updated when the engine is in a maintenance mode and in a steady state.

17. The system of claim 15, wherein the at least one bias value is updated upon at least one of engine start-up and engine reconfiguration.

18. The system of claim 15, wherein the at least one bias value is updated when the engine is set to takeoff power.

* * * * *